Patented Dec. 26, 1933

1,940,774

UNITED STATES PATENT OFFICE 1,940,774

METHOD OF TREATING WHOLE GRAIN CORN FOR CANNING

Ogden S. Sells, San Francisco, Calif.

No Drawing. Application February 18, 1930
Serial No. 429,452

5 Claims. (Cl. 99—8)

This invention relates to a process for treating whole grain green corn for canning purposes and more specifically to a heat treatment and washing steps directly after the kernels are cut from the cob.

In my co-pending application 372,210 I have described in considerable detail numerous features and advantages connected with the pre-treatment of green corn for canning purposes and more specifically to the preheating and immediate cooling of corn on the cob to coagulate and set the kernel contents to prevent loss thereof when the kernels thereof are cut from the cobs.

The process disclosed and claimed in the above copending application is the preferred process when conditions in the factory are favorable for its installations and operation and the proper equipment is installed to carry it out in an efficient manner. Instances have arisen where the installation and operation of the necessary equipment is not possible or practical due to limited factory space and other unfavorable conditions which I will mention.

In order to meet these and other conditions not favorable to the practice of the process of the mentioned application I have invented and developed a substitute process, which, while giving a little less efficient results as regards loss of juices, is, however, sufficiently efficient in practice to produce a very satisfactory product.

In the process referred to the corn is pre-heated on the cob and immediately cooled to thereby set and coagulate the kernel contents so none will be lost when the kernels are cut from the cob.

The substitute process of this application contemplates cutting the kernels from the cob without any pre-treatment and to then preferable immediately subject the cut kernels to a heat treatment to seal the kernel contents and effectively prevent any further bleeding or loss thereof, with a somewhat lower temperature and a shorter time of heat application due to the peculiar condition of treatment inherent in this process.

A small loss of the juice contents of the kernels occurs when they are cut from the cobs previous to a heat treatment, but since the cutting of whole grain kernels is carried out with special cutting machines designed to cut very close to the cob so as to leave the seed germ undisturbed in the kernels and to open the kernel skins as little as possible there is much less bleeding and loss of kernel juices than when the ordinary cutting machines are used for other styles of corn. The kernels of many varieties of sweet corn are much smaller at the germ end, which is the cob end, so that a cross sectional cut through the kernels close to the cob with the whole grain cutters exposes only a very small area of the kernel contents, and unless the cut kernels are too roughly handled the bleeding and issue of juice and pulpy matter does not constitute a serious loss at this stage of the process, but if the cut area was not immediately treated to seal the kernel contents there would be much loss and separation of kernel contents during the subsequent steps of the canning process.

By subjecting the freshly cut kernels to a heat treatment the kernel contents are immediately sealed against escape during the subsequent steps of the canning process, and on account of an exposed pulp surface the heat penetration is very much more rapid than when the kernels are heat treated on the cob, in fact a simple searing of the exposed surface due to the cut, will most effectively seal the kernel contents against separation from the kernel during subsequent steps in the canning process.

In the process disclosed in my co-pending application where the kernels are heated on the cob a comparatively longer time must be given for a proper heating of the kernel contents, because practically all of the heat must be driven in from the large exposed ends of the kernels, since this is the only portion in direct contact with the heating element because of the fact that the kernels are so closely packed around the cob, and the germ being near the small end of the kernel next to the cob it necessarily requires a longer application of heat to reach the inner areas and seal the contents throughout the entire kernel area so the germ will not escape when the kernels are cut from the cob.

In the substitute process of this application where the whole kernels are cut close to the cob so as to retain as many of the germs as possible and then immediately subjected to a heat treatment the proper sealing heat is reached much quicker with the same temperature because all surfaces of the kernels are in direct contact with the heat element, and the area having the cross sectional cut being free of the kernel skin will coagulate and thereby seal the kernel contents very quickly and quite effectively prevent future bleeding or oozing out in the subsequent steps of the process. In fact the heat application may be only sufficient to seal and coagulate the exposed cut surface of the kernels without materially penetrating into the kernel interiors, which surface sealing will be sufficient to hold the kernel contents against oozing during the subsequent steps of the canning process. This light application of heat gives easily an added advantage in not producing a cooked taste to the treated kernels and does not have the tendency that higher temperatures have of driving off the aromatic flavors present in freshly prepared corn for immediate table use.

A time and temperature that has given satisfactory results in the practice of this process ranges from about 150 to about 200 degrees F., and a time ranging from about 45 to 90 seconds. The time and temperature, however, will vary, or may vary considerably due to the ripeness or growth conditions of the corn being handled, I do not, therefore wish to confine myself to any stated time or temperature, since I consider any time or temperature that will seal the kernel contents in a manner to prevent bleeding and oozing during the ensuing steps of the canning process as falling within the scope and meaning of my invention.

A heat treatment applied to freshly cut kernel of green corn is herein contemplated in its broadest sense. The heat may be dry or moist, or may be provided solely by hot water. If the heat desired should be dry it may be provided by a heated chamber; by projecting a heated medium onto the freshly cut kernels or by electrically heated elements in close proximity to the cut kernels. If moist heat is desired it may be provided with live steam which will condense more or less and provide some moisture. If dry heat is used a washing step may be employed in either hot or cold water or other suitable liquid medium to remove the chaff and other adhering matter that is always more or less present in all cut corn. Heretofore a washing step has been impractical, except as disclosed in my copending application, because without a heating of the kernels the ordinary washing step has resulted in so great a loss of juices and pulp that it was seldom or practically never used.

A cold water washing step may be used if desired either before or after the heat treatment of the cut kernels for removing the chaff and other undesirable matter, but preferably before, and especially so where dry heat may be used to heat the kernels so that the heat absorbed by the kernels during the heat treatment will be retained for future operations, which shortens just so much the subsequent exhaust and cooking steps.

The pre-heat treatment of the cut kernels to seal the cut surface has the added advantage of also sealing the natural air and gases contained in the kernels which will be referred to in further detail.

A matter of very great concern to canners of green corn resides in the difficulty of maintaining a sufficient vacuum in the sealed cans after the product has been stored and before it reaches the consumer.

Before the filled cans are finally sealed the corn in the cans without the covers applied, is heated in an exhaust box to drive from the mass of corn and brine the occluded air and gases in the kernels. The cans are then quickly covered and sealed before the contents have materially cooled so that when fully cooled after sterilization and the mass content of the cans shrinks there will be a head space in each can and a substantial vacuum created therein which will draw the ends of the cans inward into a concave form which the trade and consuming public have been taught represents a perfect canned food.

In the ordinary process of treating and canning corn very much of the occluded air and gases are removed, but just enough remains to very materially reduce the original vacuum after the cans have stood in storage only a short time. Many times this residual air and gas is sufficient to completely destroy the original vacuum, thus releasing the inward pull on the ends when they will be easily bulged out by the jars of ordinary handling and shipping and appear as spoiled cans when in fact the contents may be perfectly good. This residual air and gas is mostly contained within the cell structure of the kernels and gradually seeps out as they stand, and, finding its way to the head space of the can partially or completely destroys the original vacuum.

By heat treating the cut kernels in any of the manners described herein tends to so seal the occluded air and gas so that it cannot escape from the kernels after, or while in storage for a very much longer time so that the vacuum originally processed into the product is maintained over longer periods which assists the canner very materially in disposing of his product.

While I have mentioned several alternative steps in the process as regards the washing of the cut kernels either before or after the heat treatment with either hot or cold water, my preferred method of treating the cut kernels is with hot water, supplying just sufficient temperature to properly seal the cut surface of the kernels so there will be no issue of juices or pulp in the subsequent process to finish the canned product. The submersion in hot water also washes the corn at the same time and frees it of any chaff or other undesirable matter which operation simplifies the heat treating and washing step desirable to produce the highest grade product.

By being able to subject the entire kernel to the heat action the juices and pulp are set and sealed against escape with a much lower temperature and a much shorter time application resulting in a very much improved product in that the kernels are not toughened; do not have a cooked taste neither are the aromatic odors driven off to the same extent as where a higher temperature and a longer time seem necessary to produce the desired results where the kernels are treated on the cob before cutting.

So far I have mentioned only the heat treating and the washing step in the process of canning corn so in order to disclose in this application a complete process the other necessary steps should be mentioned.

In mentioning additional steps in a process of canning corn I also wish to mention that various modifications are possible and each will produce a satisfactory product. For example we have packed whole grain corn without any heating step until after the kernels are in the can. The minimum practical steps for this process would be husking, cutting, washing, (in cold water to remove chaff etc.,) filling, (which may also include brining) sealing and processing.

The minimum practical steps for the process including the heat treatment and combined washing would be substantially as follows: husking, cutting, heating and washing, filling and brining, (or filling only if for vacuum pack), sealing and final processing or sterilizing.

In mentioning the process above where no heat is applied until after the kernels are in the can it should be understood that there is of necessity a slightly greater loss of juice with this process than where the kernels are heated to seal the cut area, but since the kernels are cut very closely to the cob the exposed pulp surface is comparatively small and the leakage therefore much less than the same would be where the corn is cut by the ordinary methods for ordinary style corn.

It is therefore a principal object of my invention to provide a heat treatment for whole cut kernels of green corn to seal the contents against escape through the cut surface.

It is also an object of the invention to provide a combined heat treatment and a washing step in the process of canning corn to seal the kernel contents and at the same time remove chaff or other undesirable matter from the mass of corn.

It is also an object of the invention to subject cut kernels of green corn to a heat treatment to seal the kernel contents at a time in the canning process whereby the heat absorbed by the kernel will be retained and thus assist in the following steps of the canning process.

It is also an object of the invention to produce a new article of manufacture wherein kernels of green corn are cut from the cob to retain the germ and then immediately treated with sufficient heat to seal or sear the cut surface to seal the kernel contents and prevent escape thereof in the subsequent steps of the canning process.

It is also an object of the invention to produce a new article of manufacture wherein kernels of green corn are cut from the cob and treated with just sufficient heat to sear the cut surface and seal the kernel contents, but insufficient to give the kernels a cooked taste or to drive off the valuable aromatic odors present in freshly cut corn for immediate table use.

It is also an object of the invention to provide a step in the process of canning corn, and especially whole grain corn which will remove chaff and other undesirable matter therefrom.

It is also an object of the invention to a step in the process of canning whole grain corn which will remove chaff and other undesirable matter therefrom and at the same time treat the said corn in a manner to prevent escape from the cut kernels of the juices and other kernel contents.

It is also an object of the invention to provide a step in the process of canning whole grain corn whereby heat may be applied directly to the entire surface of the kernels to seal the cut surfaces and thereby prevent further escape of the juices and other kernel contents.

It is also an object of the invention to treat cut whole grain kernels of corn with a dry heat to thereby seal the cut surfaces and prevent further escape of the kernel contents.

It is also an object of the invention to provide means for treating whole grain kernels of green corn with a dry heat to seal the cut surfaces to prevent further escape of kernel contents and to wash the cut kernels to free them of chaff or other undesirable matter, either before or after the heat treatment.

It is also an object of the invention to treat whole cut kernels of green corn with a moist heat applied through the use of steam and its condensation to seal the cut surfaces of the kernels and prevent further escape of the kernel contents.

It is also an object of the invention to treat kernels of whole grain corn by projecting a heated element directly onto the kernels to seal the cut surfaces and thereby prevent further escape of kernel contents and to supply a washing step either before or after the heat treatment to remove chaff or other undesirable matter from the kernels.

It is also an object of the invention to treat whole grain green corn by bringing it into operative relation with electrical heat to seal the cut surfaces and prevent further escape of kernel contents and to provide a washing or cleansing step either before or after the heat treatment.

It is also an object of the invention to heat treat whole grain kernels of green corn to seal the cut surfaces to prevent further escape of the kernel contents including the occluded air and gases contained in the cell structure of the said kernels and to prevent in a large measure the reduction of the vacuum processed into the cans during the canning operations, while the cans are held in storage and before they reach the consumer.

It is also an object of the invention to subject whole grain kernels of green corn to hot water to seal the cut surfaces and at the same time have the water cleanse the kernels from chaff or other undesirable matter.

Other objects and advantages have accrued in the working out and development of this invention than have been recited, and while I have described the preferred embodiments of the invention as applied to the treatment of whole grain corn in the canning process I wish it understood that the treatments referred to may be applied in different and various ways than I have mentioned, and that the invention is intended to be encompassed by the full scope and meaning of the claims.

What I claim as new and desire to secure by Letters Patents is:

1. The method of preparing whole cut kernels of green corn for canning purposes including the steps of cutting the kernels from the cobs and immediately immersing the cut material in hot water to seal the cut surfaces and retain the kernel contents intact and at the same time free the material from chaff or other undesirable material.

2. The method of preparing whole cut kernels of green corn for canning purposes including the steps of cutting the corn from the cob to retain the germ intact then subjecting the cut kernels to a washing step to remove chaff and other undesirable matter and then subjecting the washed kernels to a hot water treatment to seal the cut surfaces to retain the kernel contents in subsequent canning operations the water temperature being only sufficient to seal the cut surfaces but not to penetrate materially into the interior of the kernels to thereby prevent a cooked taste being imparted to the product and then completing the canning process.

3. The method of preparing whole cut kernels of green corn for canning purposes including the steps of cutting the corn from the cob and immediately immersing the product in a bath of hot water to wash the product free of chaff or other undesirable matter and at the same time seal the cut surfaces of the kernels to prevent further escape of kernel contents in subsequent operations, the temperature of the water being just sufficient to seal the cut surfaces of the kernels but not sufficient to drive from the corn the delicate aromatic odors present in freshly prepared corn for immediate table use.

4. In a process of preparing whole grain corn for canning in which the whole kernels are washed after being cut from the cob, the steps of heating the cut kernels prior to washing sufficiently to set the kernel contents but short of cooking and then washing the kernels to free them of chaff or other undesirable materials.

5. A process of preparing whole grain corn for canning including the steps of cutting the whole kernels from the cob, and thereafter subjecting the cut kernels for a sufficient length of time to a hot water bath of suitable temperature to set the kernel contents short of cooking and to wash the kernels free of chaff or other undesirable material.

OGDEN S. SELLS.